(12) United States Patent
De Groot et al.

(10) Patent No.: US 11,737,421 B2
(45) Date of Patent: Aug. 29, 2023

(54) METHOD FOR MILKING, MILKING SYSTEM THEREFOR AND MILKING STALL WITH SUCH A MILKING SYSTEM

(71) Applicant: LELY PATENT N.V., Maassluis (NL)

(72) Inventors: Pieter Gerlof De Groot, Maassluis (NL); Rik Steenbergen, Maassluis (NL); Ida Helena Ten Have, Maassluis (NL); Anneke Gouw, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 108 days.

(21) Appl. No.: 17/281,108

(22) PCT Filed: Oct. 10, 2019

(86) PCT No.: PCT/NL2019/050674
§ 371 (c)(1),
(2) Date: Mar. 29, 2021

(87) PCT Pub. No.: WO2020/080936
PCT Pub. Date: Apr. 23, 2020

(65) Prior Publication Data
US 2021/0337763 A1    Nov. 4, 2021

(30) Foreign Application Priority Data
Oct. 16, 2018 (NL) ...................................... 2021820

(51) Int. Cl.
*A01J 5/007* (2006.01)
(52) U.S. Cl.
CPC ............. *A01J 5/0075* (2013.01); *A01J 5/007* (2013.01)
(58) Field of Classification Search
CPC ............. A01J 5/007; A01J 5/0075; A01J 5/01
(Continued)

(56) References Cited

U.S. PATENT DOCUMENTS

| | | | |
|---|---|---|---|
| 4,034,713 A | 7/1977 | Umbaugh | |
| 5,769,024 A | 6/1998 | Ornerfors et al. | |

(Continued)

FOREIGN PATENT DOCUMENTS

| | | |
|---|---|---|
| EP | 2 252 142 A2 | 11/2010 |
| NZ | 592439 A | 7/2013 |

(Continued)

OTHER PUBLICATIONS

International Search Report dated Mar. 4, 2020 in PCT/NL2019/050674 filed Oct. 10, 2019.

(Continued)

*Primary Examiner* — David J Parsley
(74) *Attorney, Agent, or Firm* — Oblon, McClelland, Maier & Neustadt, L.L.P.

(57) ABSTRACT

A method and device for milking using a milking system with a control unit and an adjustable stimulator, including stimulating for a stimulus time and subsequently milking a dairy animal, measuring and evaluating the milk flow profile in order to determine if the milk flow profile is bimodal. If it is, then the control unit automatically adjusts the stimulating operation by extending the stimulating operation by an extension value. If it is not, then the control unit may, optionally automatically, shorten the stimulating operation. As a result, the milking system is able to reduce the strain on the teats caused by unnecessary stimulation or by milking in an efficient way during a bimodal part of the milking operation and also to adjust this during the entire lactation, if necessary. In this way, changes in the dairy animal itself are also compensated for.

20 Claims, 3 Drawing Sheets

Figure 1:
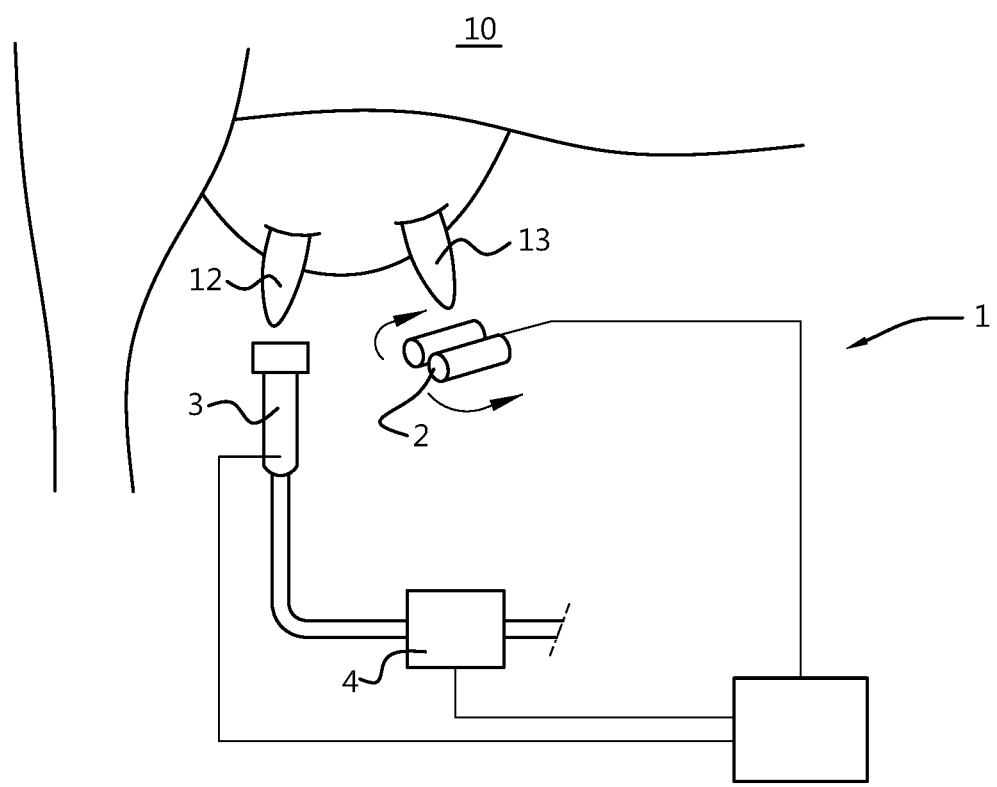

(58) Field of Classification Search
USPC .................. 119/14.01, 14.02, 14.15, 664
See application file for complete search history.

(56) References Cited

U.S. PATENT DOCUMENTS

| | | | | |
|---|---|---|---|---|
| 6,095,086 | A * | 8/2000 | Aurik ................... | A01J 5/0175 |
| | | | | 119/14.02 |
| 7,484,474 | B2 * | 2/2009 | Van Den Berg ........ | A01J 5/017 |
| | | | | 119/14.02 |
| 8,646,411 | B2 * | 2/2014 | Wartenhorst ............ | A01J 5/007 |
| | | | | 119/14.17 |
| 2004/0050330 | A1 | 3/2004 | Ebeling et al. | |
| 2008/0127896 | A1 | 6/2008 | Petterson et al. | |
| 2011/0232576 | A1 | 9/2011 | Van Der Tol et al. | |

FOREIGN PATENT DOCUMENTS

| | | |
|---|---|---|
| RU | 2002110072 A | 3/2004 |
| WO | WO 95/31095 A1 | 11/1995 |
| WO | WO 2009/093966 A2 | 7/2009 |
| WO | WO 2010/068088 A1 | 6/2010 |
| WO | WO 2012/022356 A1 | 2/2012 |

OTHER PUBLICATIONS

Sandrucci, A., et al., "Factors Affecting Milk Flow Traits in Dairy Cows: Results of a Field Study", J. Diary Sci., vol. 90, 2007, pp. 1159-1167.

* cited by examiner

METHOD FOR MILKING, MILKING SYSTEM THEREFOR AND MILKING STALL WITH SUCH A MILKING SYSTEM

The present relates to a method for milking a dairy animal in milking operations using an automatic milking device which comprises milking cups, an adjustable stimulating means, a milk flow meter and a control unit, wherein the milking device is configured for a stimulating operation comprising stimulating the dairy animal with the stimulating means to induce a milk let-down reflex for a stimulus time determined prior to the milking operation, as well as a waiting time, which is determined prior to the milking operation, between an end of the stimulating operation and a start of milking a teat of the dairy animal using one of the milking cups, which waiting time may be zero, wherein the method comprises a) a milking step, comprising performing one or more milking operations on the dairy animal using the milking cups and a setting of the stimulating means which is set prior to the milking step, b) a measuring step, comprising measuring a milk flow profile of at least one rear teat or a front teat during each of the one or more milking operations using the milk flow meter.

Normally, during milking, the milk flow of a teat initially increases up to a maximum in the main milking phase which is maintained until the udder has been virtually milked out, after which the milk flow falls, until the milking operation is stopped. It is known that a milk flow profile may turn out to be what is referred to as bimodal. This means that although the milk flow initially increases, it does not reach the intended peak level, then falls, sometimes even to virtually zero, and only thereafter increases to the true main milking phase. This is caused by the fact that, initially, in principle only the cistern milk is milked. This is milk which the milk alveoli already delivered to the cistern, and which milk can be milked directly, without requiring a milk let-down reflex. The latter is required for milking the alveolar milk, and is controlled by the hormone oxytocin. After the dairy animal has been stimulated to a sufficient degree, often involving tactile stimuli of the udder, the blood concentration of this hormone has increased sufficiently to generate the reflex, in which case the milk alveoli contract and the milk becomes available for milking via the cistern. As the amount of cistern milk is limited compared to the amount of alveolar milk, it may be that, if milking is started after insufficient stimulus or too quickly after stimulus, the amount of cistern milk has already been milked before the alveolar milk becomes available. However, this means that, during the time period when little, or insufficient, milk can be milked, the teat is placed under an unnecessarily great strain, due to the applied milking vacuum, in particular if this vacuum is increased after an assumed start of the main milking phase. This may result in, for example, discomfort or worse for the animal, such as callous formation at the teat end. It is also possible for the teat or milking cup to creep up the teat and cut off the milk duct, so that the main milk flow sometimes does not even get started. In addition, it has been found that the total time the dairy animal spends in the milking stall for the milking operation has increased compared with an ideal milking operation without bimodality.

Preventing such an unnecessarily strenuous and long-lasting milking operation has been found to be laborious. Thus, U.S. Pat. No. 4,790,261 described that the stimulus requirement may differ for each animal and may be dependent, inter alia, on the lactation stage. However, no details are given on how to determine the stimulus requirement except by observing the animal.

Document WO01/50842A1 describes a milking method with modified stimulation in order to prevent a bimodal milk flow and creeping of the milking cup, in which, in a starting phase, a relatively high pulsation frequency and relatively short resting phase is used for pulsing, while still performing milking to a certain degree. The pulsation frequency and the ratio between suction/rest stroke may be determined and stored individually, taking into account the milking behavior of the animal. However, no details are given about how to determine these parameters on the basis of the milking behavior.

Document US2004/0050330 describes a milking method in which the animal is stimulated without milk being extracted in the process, and for a time which depends on the predicted amount of cistern and/or alveolar milk. The effect of the stimulation is preferably checked during the main milking phase, by means of suitable measuring equipment, such as for the milk flow and the milk yield. These data may be used as initial data to determine the subsequent stimulation phases. However, the document does not disclose in which way the data may be processed to arrive at stimulation and milking operation which is adapted to the animal in an optimum manner.

Document WO95/31095A1 describes that a dairy animal may be subjected to an individually adjusted pulsation in which it is stimulated until the milking operation meets a predetermined criterion. The criterion is either that the current milk yield reaches a predetermined value, or that, on the one hand, the current milk yield reaches a predetermined value and that the milk flow and/or the stimulus duration reach respective predetermined values. The predetermined values may depend on, inter alia, breed, milk yield, lactation stage etc. and have to be determined experimentally beforehand. Nevertheless, for all three parameters, only values for all dairy animals together are given. This method is very laborious, in particular if experiments have to be carried out during an entire lactation. In addition, no description is given of the way in which the predetermined values are to be determined in order to arrive at the criteria for ending or adjusting the stimulation, respectively.

With all known prior-art methods, the method is either not suitable for individually adjusting the stimulation, or too laborious because many long-lasting experiments have to be carried out, or no description is given of the way in which the criteria for adjusting the stimulation are to be determined. Thus, none of the methods described seem able to provide an optimum individualized stimulation of a dairy animal in an efficient way and for the entire lactation.

It is therefore an object of the present invention to improve the prior-art method and in particular to simplify it. A further object of the invention is to provide a robust method, that is to say able to cope with changes in the properties of the dairy animal, such as during lactation.

The invention achieves at least one of these objects by a method as claimed, in particular a method for milking a dairy animal in milking operations using an automatic milking device which comprises milking cups, an adjustable stimulating means, a milk flow meter and a control unit, wherein the milking device is configured for a stimulating operation comprising stimulating the dairy animal with the stimulating means to induce a milk let-down reflex for a stimulus time determined prior to the milking operation, as well as a waiting time, which is determined prior to the milking operation, between an end of the stimulating operation and a start of milking a teat of the dairy animal using one of the milking cups, wherein the stimulus time and/or the waiting time are adjustable by the control unit, and which waiting time may be zero, wherein the method comprises a) a milking step, comprising performing one or more milking operations on the dairy animal using the milking cups and a setting of the stimulating means which is set prior to the milking step, b) a measuring step, comprising measuring a milk flow profile of at least one rear teat or a front teat during each of the one or more milking operations using the milk flow meter, c) an evaluation step, comprising determining if the milk flow profile of each of the measured milk flow profiles is bimodal using the control unit, d) an adjustment step, comprising, if at least one of the evaluated milk flow profiles is bimodal, the control unit automatically adjusting the stimulating operation for the dairy animal by extending the stimulus time by a stimulus-extension value and/or extending the waiting time by a waiting-extension value, and furthermore comprises repeating steps a) to d) at least once, including the adjusted stimulating operation and using a predetermined habituation period which comprises one of a predetermined number of milking operations or a predetermined duration.

The invention is based on the understanding that stimulation is functional and that therefore, in order to adjust the stimulation, its result has to be considered, namely an uninterrupted milk flow. With the method, the control unit evaluates the milk flow on the basis of whether or not bimodality has been detected and is then able to adjust the stimulation in a dynamic way and tailored to the animal in question. To this end, the control unit adjusts the stimulation, if required, in the course of one or a few milking operations, in the form of, for example, an extended stimulus time and/or an extended waiting time between the end of the stimulation and start of the milking operation. Thus, the stimulation can automatically be adjusted to each dairy animal and can also change over time as the dairy animal develops other properties, such as over the course of the lactation, but also in other cases, such as a fall in milk production after illness or the like. It is also important that the stimulus time is optimized for each dairy animal, so that the teat is in principle not placed under unnecessarily great strain, whereas, due to a possible stepwise extension of the stimulation, the total time is kept as short as possible, which is advantageous for the total milking machine capacity.

It should be noted that no exact limits have to be given for bimodality, as long as the way in which the control unit has to determine this is clear. All this will be explained below in more detail. In general, it is possible to say that extreme bimodality occurs if, as was mentioned in the introduction, at the start of milking the cistern milk which is always available is milked off and is finished before the alveolar milk becomes available during the main milking phase. In such a case, the stimulation has been insufficient, the stimulation comprising performing, in particular tactile, stimuli as well as a possible subsequent waiting time. One proposed prior-art solution for this problem is waiting to milk until the alveolar milk is expected to be available as well. However, this means that the entire amount of milk, i.e. including the cistern milk, can only be milked after the stimulating operation has been finished. This may however unnecessarily extend the total milking time and thus reduce the machine capacity. It may be advantageous to adjust the stimulating operation such that the reduction in the flow of cistern milk and the start of the flow of alveolar milk blend in with one another. In this way, the milking time should in theory be shortest and without any excessive strain on the teats being exerted in the meantime or overall. This will also be explained in greater detail below.

Particular embodiments are described in the dependent claims, as well as in the following part of the description.

In particular, there is a maximum total time for stimulation. This means that the control unit is configured to extend the stimulus time to at most a predetermined maximum duration. It has been found that the milk let-down reflex effect of oxytocin, and thus of the stimulation, is limited in terms of time if it is not followed by actual milking. In addition, a stimulation of unlimited duration would result in an excessive reduction in the milking machine capacity, while, for the dairy animal, the effect of a less straining milking operation is nullified by an excessively long and consequently straining stimulation. This maximum duration may in principle be determined experimentally for each breed or even each animal, but it is also possible to set a fixed maximum duration of for example 75 or 90 seconds.

As has already been mentioned, the control unit is configured to optimize the stimulation by extending the stimulus time until the measured milk flow profile is no longer bimodal. In embodiments, step d) comprises that, if none of the evaluated milk flow profiles is bimodal, the control unit automatically adjusts the stimulating operation for the dairy animal by shortening the stimulus time by a stimulation-reduction value and/or by shortening the waiting time by a waiting-reduction value. This is particularly advantageous if a dairy animal has not been bimodal from the start. The reason for this may be that the standard setting for the stimulating operation was already longer than was necessary. It may then be advantageous, both for the dairy animal and the milking machine capacity, if the control unit is able to reduce the total stimulus time. By being able to perform both an extending and a shortening step, all this depending on the result in the form of an optimum milking operation with continuous milk flow, a minimal strain on the animal and a maximum machine capacity is achieved.

It should be noted that said standard setting may be a stimulus time which is the same for all dairy animals or a stimulus time which is based, for example, on historical data of the respective breed or even the individual dairy animal. Obviously, these individual data are not always available and particularly during the first lactations, they can often change quickly. Nevertheless, individually choosing a setting for the total stimulus time may result in the optimum condition being reached sooner.

A criterion is required in order to be able to determine bimodality in a milk flow profile. As long as the purpose of the criterion is to detect an undesired milk flow profile, it is acceptable and may thus be chosen within specific limits. In usable embodiments, in step c) the control unit determines a milk flow profile as bimodal if the milk flow reaches a local peak of at least a predetermined value of, for example, 200 g/minute within a predetermined period from the start of the milk flow, then falls to a local minimum, the decrease exceeding at least a predetermined threshold, for example 100 g/minute or 20%, and then, after at least a predetermined interim period of, for example, 6 seconds, increases again and then changes to the plateau stage or main milking phase. The main milking phase may, for example, also be inferred from the fact that each teat reaches a peak milk flow, which in turn may be, for example, a running average of the peak milk flows of the recent milking operations. However, other definitions are also possible. For example, the literature also mentions a definition for bimodality where a milk flow falls by at least 200 g/minute from one 15 second interval to the next during the first 75 seconds, then does not fall during the two subsequent 15 second intervals, after which the milk flow is approximately zero. Another very useful definition is a milk flow profile with two increases within 1 minute after the start of the milk flow, which are separated by a fall of at least 200 g/minute. In all these cases, there is an interruption or pause in the milk flow which is probably caused by the fact that the alveolar milk has not been released yet.

When such a local peak is present, it is readily possible to determine the degree of bimodality. In particular, the control unit assigns a value for the bimodality to the milk flow profile based on the local peak and/or said fall. For example, the control unit determines the value of the bimodality as said relative (percentual) fall in the milk flow after the local peak, i.e. to the subsequent local minimum. Assuming that the local peak is 250 g/minute and that the milk flow then falls to 140 g/minute, then the fall is 110 g/minute or 0.44=44%.

The control unit is also able to perform a similar operation for profiles which could be regarded as bimodal despite the absence of a clear local maximum in the milk flow profile. The reason for this is that it is also possible for the flow of cistern milk to fall fairly slowly and for the flow of alveolar milk to start up quite gradually. In the case of only a partial overlap, the net total milk flow will increase relatively slowly. It has been found that an increase in the milk flow which takes longer than usual and a decrease stage of the milk flow which lasts longer than usual indicate insufficient stimulation, resulting in a kind of bimodality. Thus, it is still possible to improve animal comfort and milking machine capacity by improving stimulation. Therefore, in embodiments, the control unit in step c) determines that a milk flow profile is bimodal if the milk flow, from the start of the milk flow, takes longer than a predetermined rise time, for example 30 seconds, to reach a peak flow of a main milking phase of the milk flow, and/or if the milk flow from said peak flow of said main milking phase takes longer than a predetermined fall time, for example 30 seconds, before the control unit stops the milking operation. By adjusting the stimulation, the milk flow profile may also be improved in these cases, as the milk flow profile will show a relatively short rise and fall, which may obviously shorten the milking time and free up machine time for other milking operations.

In this case, it may again be advantageous if the control unit is configured to determine the degree of bimodality. In particular, the control unit assigns a value for the bimodality to the milk flow profile based on the rise time and/or the fall time. For example, the control unit may define the value of bimodality as $(T_{peak}-T_{threshold})/T_{threshold}$, where
$T_{peak}$=the time from the start of the milking operation until peak milk flow is reached,
$T_{threshold}$=the predetermined rise time, such as 30 seconds.
The control unit may also be configured to perform a similar determination of the value of the bimodality on the basis of the decrease in the milk flow at the end of the milking operation. It will be clear that both the number of 30 seconds and the calculation method can be chosen freely to some degree, such as based on the breed of dairy animal as well as the wishes of the farmer. It should furthermore be noted that "reaching the peak milk flow" is to be understood as meaning reaching the main milking phase. The milk flow in the main milking phase is often practically flat and then has a constant value, except for some slight deviations. The peak milk flow is then for example the average milk flow value in the part of the milking operation in which the milk flow deviates by less than (for example) 5% from that average. The time from the start of milking to the moment that that part of the milking operation is reached, i.e. starting with 5% below the peak milk flow to be determined later (which is only possible afterwards when the milk flow profile is being evaluated) then is the time of the rising part of the milk flow profile. A similar definition applies to the fall, for example, such as the moment the milk flow falls below 5% under the peak milk flow, to the moment when the milking cup is removed or also, if this occurs sooner, when milking of the respective teat is stopped. In this case as well, other definitions of the peak milk flow and of an acceptable bandwidth thereof are certainly possible. Evaluation of the milk flow profile is in fact only possible after the milking operation has finished and, in addition, the fact that (dairy) animals are living beings which do not necessarily behave in an automated manner has to be taken into account. Nevertheless, it is advantageous to use a clear and unambiguous definition of bimodality (with a local peak and/or relatively long rise/fall) in the control unit.

In embodiments, the control unit automatically adjusts the stimulation step in step d) to a degree which depends on the value which is determined for the bimodality. In particular, the stimulus-extension value and/or the waiting-extension value depend on the value which is determined for the bimodality. Thus, the above-described value of the bimodality may be used by the control unit in order to adjust the stimulation accordingly. After all, with a very obvious local peak in the milk flow, the stimulation will much less adequate than if only a slight reduction or even only a delayed increase in the milk flow is measured. Due to the fact that the degree to which the stimulation is adjusted in principle matches the degree of bimodality, it is possible to optimize the stimulation very quickly. Incidentally, the correlation between the value of the bimodality and the adjustment of the stimulation (time) does not have to be linear. In theory, any other mathematical correlation may be used, although it has to be strictly non-falling, and the ratio between both will be non-negative, in other words a greater bimodality will also lead to a greater adjustment of the stimulation.

In this case, it is important to note that, in embodiments, the control unit may be set such that the stimulation is only adjusted if the value of the bimodality exceeds a threshold value. Thus, it is possible to ensure, for example, that the stimulation is not adjusted unnecessarily in order not to subject the dairy animals to changes unnecessarily. The threshold value is chosen in accordance with the method used for calculating the bimodality.

In embodiments, the habituation period for milking with the adjusted setting is chosen by the control unit based on the stimulus-extension value and/or the waiting-extension value, wherein the habituation period is shorter with relatively small value(s) in particular. Dairy animals are living beings which often require some time in order to get used to a change. So as to prevent an undesired reaction to a change in the stimulation from detracting from the true reaction of the animal, the control unit is configured to apply a habituation period. This means, for example, that measurements during the habituation period are ignored and measurements are only resumed at the end thereof. It is also possible to use the habituation period in a different way, such as for averaging the measurements of the milk flow profile performed during this habituation period. This averaging may, for example, involve the mathematical average, a running average or a weighted average, with the later measurements being given a greater weight. This habituation period will be longer if the adjustment of the stimulation is relatively great, i.e. in the present case with a relatively great change of the stimulation- and/or waiting-extension value, and obviously the reverse for a relatively small adjustment.

Furthermore, it is possible, in embodiments, for the control unit to be configured to adjust the stimulation in dependence on other variables, in particular variables which relate to the amount of cistern milk. In particular, the control unit is configured to adjust the stimulation based on the time since the last milking operation (time between milkings, milking interval), the milk production speed, the lactation value and/or the lactation stage of the dairy animal. In the first two cases, there will be a relatively large amount of cistern milk if the value of the respective parameter is relatively large, and this is in principle associated with a relatively short stimulation (time). As is true in principle for this entire document, the cistern milk is considered per udder quarter. Furthermore, for example heifers (primiparous cows) are less bimodal than multiparous cows. And towards the end of a lactation, for example, a cow's production is lower, thus containing less cistern milk and with a greater chance of (a relatively strong) bimodality. The degree of dependency can in each case be determined experimentally, both for the dairy animal breed and for each animal individually. In turn, adjusting the lactation may involve adjusting the stimulus duration and/or the waiting time and/or the habituation period. All this will be explained in more detail in the context of the third aspect of the invention.

According to a second aspect, the invention also relates to a milking system as claimed in claim 9 for milking a dairy animal, comprising milking cups for milking the milk, an adjustable stimulating means, a milk flow meter for measuring a flow of the milked milk, and a control unit for controlling at least the stimulating means, wherein the milking device is configured for a stimulating operation comprising stimulating the dairy animal to induce a milk let-down reflex for a stimulus time, adjustable by the control unit and determined prior to the milking operation using the stimulating means, as well as a waiting time, which is determined prior to the milking operation, between an end of the stimulating operation and a start of milking a teat of the dairy animal using one of the milking cups, which waiting time may be zero, wherein the milking system, and in particular the control unit, is configured to automatically carry out a method according to the first aspect of the invention. Such a milking device is equipped to optimize the stimulation of each individual dairy animal in an efficient and effective way by means of the above-described method, as a result of which the milking capacity of such a milking system may be increased. In principle, the further advantages of the above-described methods apply in full to milking systems in which this method is implemented in the control unit and therefore not all of these will be repeated below.

In embodiments of the milking system, the stimulating means comprises one or more teat-cleaning brushes or a separate cleaning cup, and said waiting time is in particular greater than zero. Such teat-cleaning brushes and cups are virtually always employed in succession per teat. As a result, the stimulation will start when cleaning of the first teat starts. When the next teat is being cleaned, and also in the meantime, while the cleaner is moved to this next teat, which in fact already causes a (short) waiting time to occur, the stimulation will continue. After all, this is a process at animal level and not at teat level. However, when considering the stimulation at teat level, it may seem as if a waiting time is applied, during which waiting time the subsequent teats are thus in fact cleaned. In addition, the milking cups have to be attached to the teats after teat cleaning and stimulation before milking can take place. Obviously, this takes some time, which time automatically involves a (necessary) waiting time. This waiting time, at least a lower limit thereof during unimpeded—and thus as quick as possible—attachment may be known per se for each dairy animal, at least for each milking system, from previous milking operations. Advantageously, the control unit takes this into account, for example by making allowance for this minimal waiting time.

It is likewise possible, in the case of teat-cleaning brushes, to monitor the stimulating operation. Cleaning brushes are driven by a brush motor and preferably the control unit is configured to monitor the brush motor, in particular the motor current, the motor voltage or the motor torque thereof. The control unit is then preferably furthermore configured to determine the starting moment of stimulation as the moment when said motor current, motor voltage or motor torque exceeds a predetermined threshold value and/or to determine the duration of the stimulating operation as the time period during which said motor current, motor voltage or motor torque is over said threshold value. This threshold value has, for example, been determined experimentally in practice. In these embodiments, it is thus possible to determine the moment when stimulation starts more accurately. The possibility that the brushes do rotate but without touching and cleaning a teat does not result in effective stimulation (and cleaning) in this case. It is thus possible to determine the starting point of the stimulating operation more accurately, which is important if it is necessary to determine, for example, any waiting time. Furthermore and for the same reason, it is thus possible to determine the actual (total) duration of the stimulating operation more accurately.

In embodiments of the milking system, the stimulating means is alternatively or additionally incorporated in the milking cups and the waiting time is, in particular, zero. In this embodiment, the milking cups are placed directly on the teats and the teats are subsequently cleaned, using, for example, water jets, and—partly simultaneously—also stimulated, such as by means of pulsation at increased frequency and a reduced suction/rest stroke ratio. In principle, such a milking system can immediately switch from stimulating, during which operation no milking or hardly any takes place, to milking. To this end, only for example the pulsation has to be adjusted, which may take less than 1 second. In such a case, the control unit does not therefore have to take a minimal waiting time into account. Obviously, with these milking systems it is likewise always possible to stop the physical stimulation, at least to minimize it, but still wait for some time before starting with proper milking, for example by only placing the milking cups on the teat but without any movement or pulsation taking place. In this way, it is also possible to introduce a waiting time here as well, which may be advantageous in order to reduce the strain on the teats as much as possible.

In a third aspect, the invention also relates to a milking parlor as claimed in claim 12 for a plurality of dairy animals, and provided with a milking system according to the second aspect of the invention, wherein the dairy animals are milked in groups in the milking system according to a fixed rhythm with fixed milking intervals, and wherein the habituation period is 1 or 2 days. In many milking parlors, milking still takes place according to a fixed schedule, in which a group of dairy animals is driven to the milking system in order to be successively milked there. In this case, the teats are usually cleaned by hand and the milking cups are usually attached by hand. In this case, it is important that the stimulation can be adjusted individually by, in particular, varying a waiting time for each animal individually. If the stimulating operation is employed in the form of initially higher frequency pulsation without milking, it is also possible to employ the present method in its entirety.

With the abovementioned milking parlors, fixed milking intervals are used. These may each be, for example, 12 hours, so that habituation can occur very quickly, meaning that 1 or 2 days may already suffice for habituation to occur. Incidentally, other habituation periods are readily possible, in particular with significant adjustments at the start of a lactation, and these may be more advantageous than the 1 or 2 days proposed here, which are again quite useful during the lactation.

In other embodiments of the milking parlor for a plurality of dairy animals, said milking parlor is provided with a milking system according to the second aspect of the invention, wherein the milking system can be visited freely by the dairy animals and the habituation period is at least 2 days, in particular a week. Here, the milking system is virtually without exception a robotized automatic milking system which is able to attach the milking cups autonomously and can perform the required stimulation prior to milking, either by means of these milking cups or by means of a stimulating means (and/or cleaner) provided for the purpose, all this as has already been described for the milking system according to the invention. In particular, the control unit choses the habituation period based on the milking frequency and/or on the variation in the successive milking intervals of the dairy animal.

With such milking parlors, the dairy animals are able to frequent the milking system when they wish. As a result, the intervals between the successive milking operations of a dairy animal may differ (greatly). Advantageously, the control unit of the milking system according to the invention is configured to take this into account. It has already been described above that the control unit may be configured to set the stimulation on the basis of the milking interval. In the embodiments intended here, it advantageously also works the other way around and the control unit is configured to determine the desired/required stimulation from milk flow profiles measured at different milking intervals. This will be explained in more detail below.

During the starting period, a number of measurements will take place in order to determine the milk flow profile at the initial setting of the stimulation, but also during the period after changing the stimulation setting, in which case, in all likelihood, a number of different milking intervals will occur. The result will be that different amounts of cistern milk and of alveolar milk will also have been produced by the dairy animal. Assuming that the stimulation setting does not change during this period, the bimodality will usually show a dependence on the milking interval. The bimodality value of the milking operations with a short milking interval will be greater than of the milking operations with a long milking interval. If the control unit plots the bimodality values against the milking interval, a point cloud will be created on which, for example, a dependence function may be determined using (linear or other) regression. Thus, it is possible to decide for each milking interval if the stimulation has to be modified and, if so, by how much. By way of example, the milking intervals with a bimodality above the threshold value may be looked at. In most cases, this means that the stimulation for all milking intervals which are shorter than a threshold interval, which then have an excessive bimodality, may be adjusted by a degree which depends on the determined bimodality values.

A further refinement is possible in this case. If the control unit already used a stimulation setting which, according to a mathematical function, depends on the milking interval, the bimodality will show a degree of dependence as a function of the milking interval, as has been described above in general terms. In this case, it is possible that the control unit, following analysis of the bimodality of the various milking operations with different milking intervals, simultaneously adjusts the mathematical function for the relevant milking intervals, that is to say those milking intervals where the bimodality exceeds a threshold value. In this case, the adjustment may be an extension at a fixed stimulation—and/or waiting-extension value, but also, and advantageously, a fit with a stimulation—and/or waiting-extension value which, in turn, is a (different) function of the milking interval. After all, the bimodality for different milking intervals is often different, so that this may also necessitate a different adjustment of the stimulation, all this as described for the method according to the invention.

It should furthermore be noted that historical data may be important when optimizing the abovementioned embodiment. Thus, if a dairy animal is recognized which already shows a certain degree of bimodality in a number of cases, such as a certain combination of lactation days and milking interval, the control unit will also be able to effect an adjustment of the stimulation. Thus. the analyzing stage can be skipped in situations which would nevertheless (with a great degree of certainty) result in bimodality.

It is also possible for the milking system to comprise a plurality of milking robots, each of which has cleaning brushes or a separate cleaning cup. Advantageously, the control unit then comprises a memory with a minimum and an average connecting time for the first milking cup for each milking robot and for each dairy animal, and wherein the control unit takes said minimum or average connecting time into account when determining the waiting time between stimulation and start of the milking. Thus, the possible, actual waiting time for the dairy animal is in principle the same even with different milking robots. After cleaning and stimulating with the cleaning brushes or the separate cleaning cup, the milking cups are attached after a time period which is not too short and not too long. It should be noted that this problem does not occur in the case of cleaning, stimulating and milking with the same milking cup, since in that case the actual connecting time after cleaning is zero It will be clear that many, many variations on this theme will be possible according to the invention. However, what is important is that the control unit itself measures the relevant variables, in the first instance the milk flow profile, and optionally milking interval, days in lactation, milk production, and subsequently analyses these data itself, and is able to automatically adjust the stimulation therefrom. This ensures that the stimulation of the dairy animals can be adjusted automatically to the requirements in a dynamic and efficient way for each animal individually, so that the strain on the animals, in particular of the teats, is reduced as much as possible, and so that the capacity of the milking system which is equipped in this way can be increased.

Figure 2A:
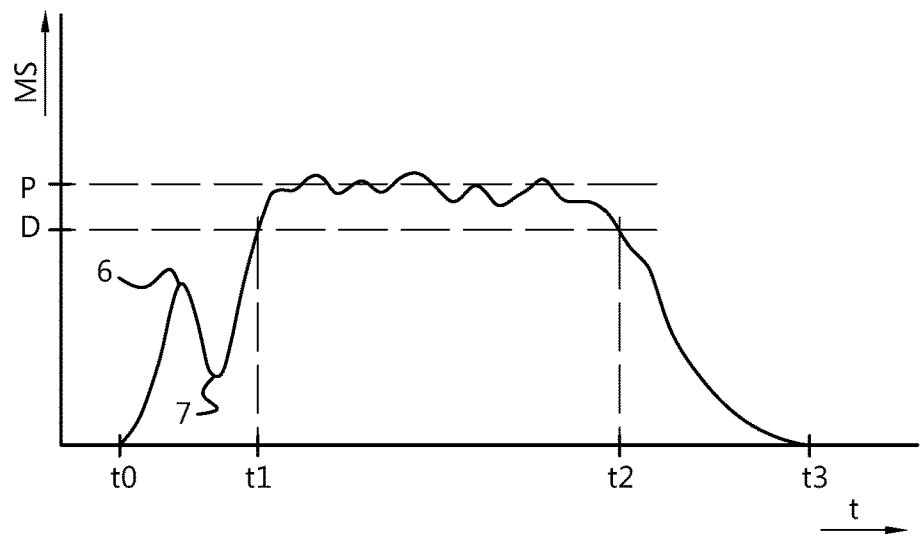
Figure 2B:
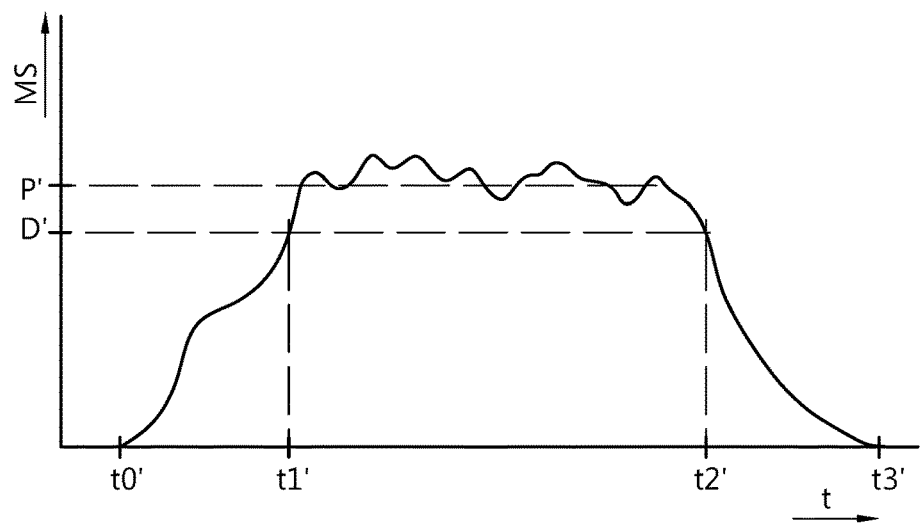
Figure 2C:
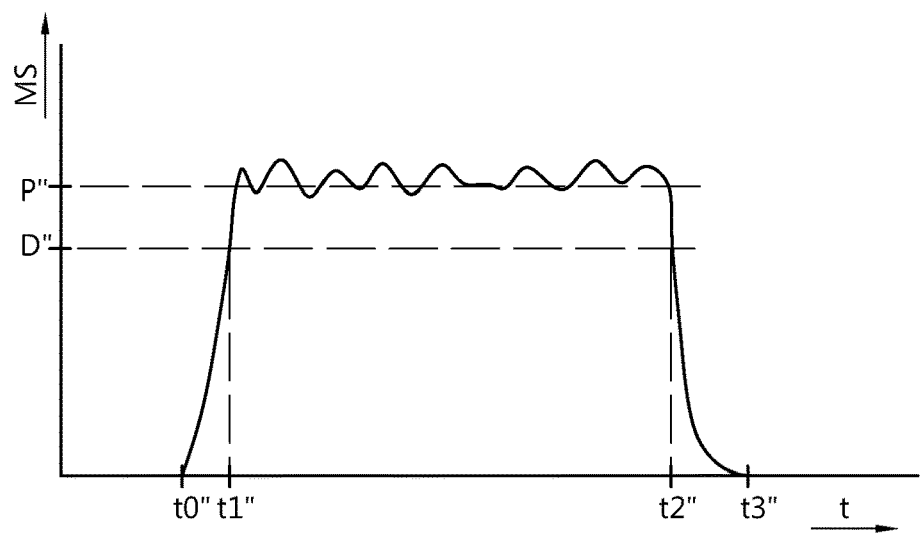
Figure 3:
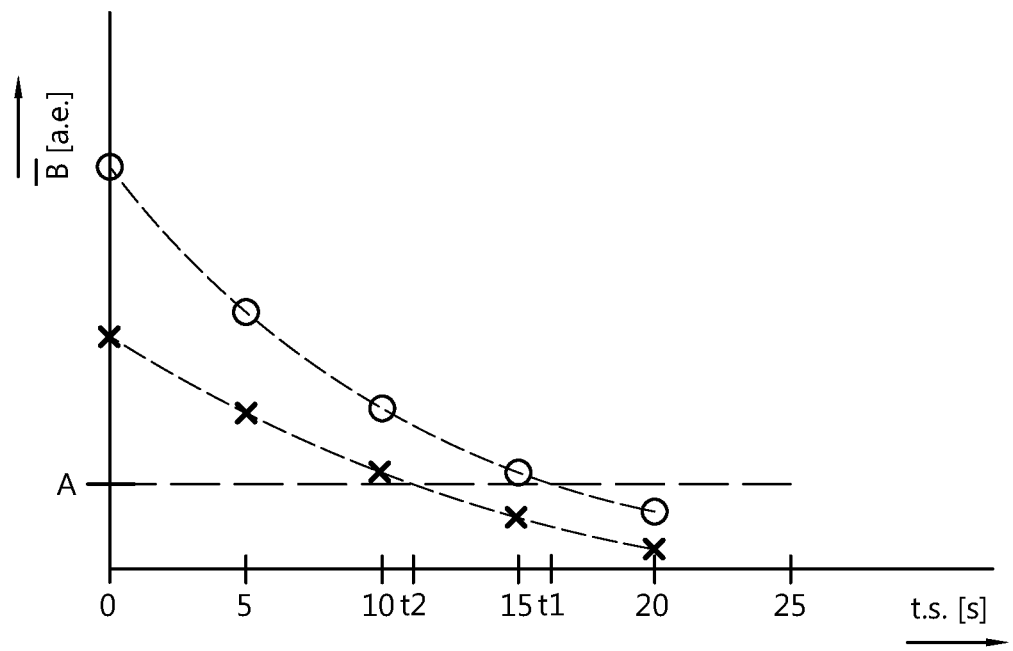
Figure 4:
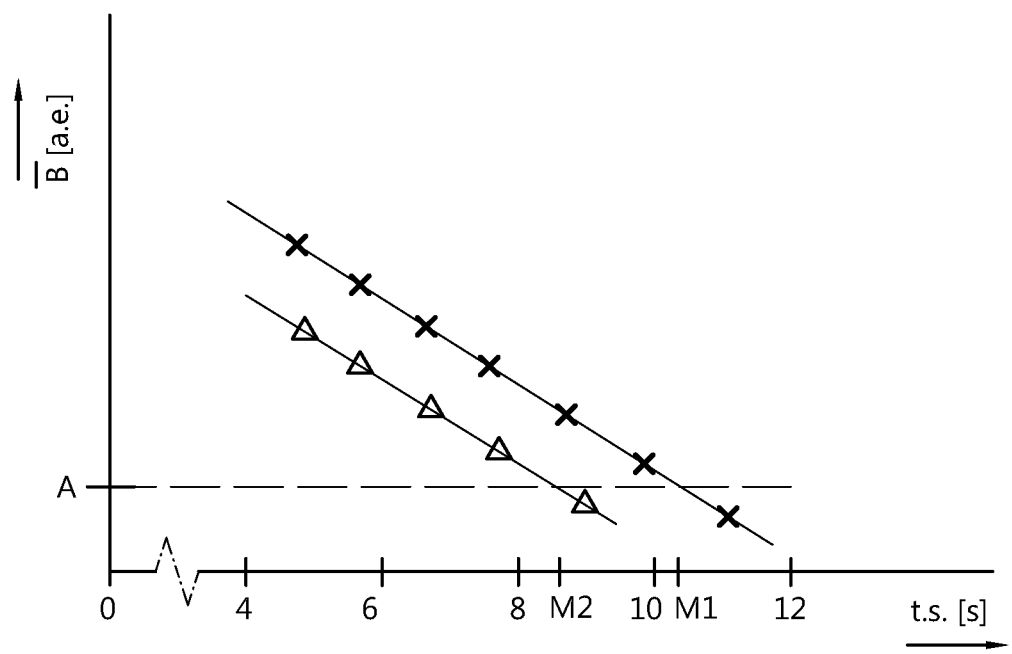

The invention will be explained in more detail below by means of the drawing, in which some aspects of the present invention are illustrated, and in which:

FIG. 1 highly diagrammatically shows a milking system according to the invention, FIGS. 2*a-c* diagrammatically show three milk flow profiles, FIG. 3 diagrammatically shows a diagram with the bimodality as a function of the stimulus time for a dairy animal, and FIG. 4 diagrammatically shows a diagram with the bimodality as a function of the milking interval for a dairy animal and for two fixed stimulus times.

FIG. 1 highly diagrammatically shows a milking system according to the invention. This milking system 1 for milking a dairy animal 10 with an udder 11 having a rear teat 12 and a front teat 13 comprises brushes 2 which are rotatable in the direction of the arrows, as well as a milking cup 3, a milk flow meter 4 and a control unit 5.

In practice, the illustrated milking system will comprises more than one milking cup 3 with each a milk flow meter 4, but for the sake of clarity only one is illustrated here in each case. It is also possible to provide only one front teat and/or one rear teat with a milk flow meter, but obviously the amount of information will then be reduced. In that case, it is advisable to provide the milk flow meter on the front teat and rear teat which was attached first, respectively. In addition, it is also possible to replace the milk flow meter with a milk yield meter, with the control unit 5, for example, being configured to determine a milk flow from a time-derived milk yield.

The brushes 2 have a double function. On the one hand, they serve for cleaning the teats and on the other hand they induce the oxytocin reflex by cleaning, as a result of which the oxytocin hormone is released into blood stream, which in turn causes the milk secretory cells in the udder 11 to secrete the alveolar milk, so that this can be milked via the udder cistern and the teats 12, 13. On account of the increasing (milk) pressure in the udder 11, a gradually increasing amount of milk will leak to the udder cistern during one milk production. This is milk which can be milked directly, that is to say also without stimulation.

The brushes are drivable by means of one or more brush motors (not shown here). The control unit 5 is configured to monitor the brush motor(s), in particular to measure the motor current or the motor voltage or the motor torque. When a predetermined threshold value for these is exceeded, the control unit 5 determines the start of stimulation. As long as said value remains above the threshold value, the brush motor(s) is (are) deemed to be performing a stimulating action.

It is also possible to use a different (cleaning and) stimulating means instead of the brushes 2. One of the known means is a separate cleaning cup which is successively attached to the teats and cleans the respective teat and stimulates the dairy animal. It is also possible to use a single milking cup for each teat which cleans the teat, for example using a liquid jet, dries using air and stimulates.

The milking, both of the cistern milk and of the alveolar milk, takes place by means of milking cups 3, and the milk flow is measured here using a milk flow meter 4. Attaching the milking cups 3 may be effected by means of a robot arm and a teat detection system (neither of which are shown) in a milking robot system or by hand in a conventional milking system. In this case, the latter is also deemed to be an automatic milking system with regard to the milking itself, and the former robot system is deemed to be fully automatic, also referred to (for the sake of clarity) as robot milking system. However, it will be clear that the way of attaching the milking cups per se is not significant for the invention. What may be significant in the case of conventional milking is the fact that the cleaning and (thus first) stimulation will often take place by hand. The milking cup itself may then provide (additional) stimulation, for example, as is known per se, by performing a quick pulsation massage on the teat by sucking without milk. Since cleaning and attaching the milking cups by hand per se can be performed quickly and in a known and fixed rhythm, the present invention may be carried out by setting the additional stimulation as if it were the stimulation.

When attaching the milking cup 3 to a teat, such as a rear teat 12 or a front teat 13, it will be possible for milk to flow from the moment a milking vacuum has been produced in the milking cup and pulsation has started. This milk flow is measured as a function of time by means of the milk flow meter 4 and is processed by the control unit 5 to produce a milk flow profile. In this case, measuring may be continuous or also via regular sampling of the milk flow. The control unit 5 then evaluates the measured milk flow profile in order to evaluate the (possible) bimodality of the measured profile. This will be explained in more detail with reference to the FIGS. 2a-c.

FIGS. 2a-c diagrammatically show three milk flow profiles. Relevant parts are denoted by the same reference numerals and additionally provided with a single (') or double (") inverted comma for each part figure. As can be seen, the milk flow comprises a rising phase, a main milking phase and a falling phase. In each case, the main milking phase runs from t1 to t2 and is characterized by a peak milk flow P which may be defined in various ways. For example, the maximum of a running average milk flow is taken over a certain time period, although other definitions are possible. It goes without saying that the rising phase is the first part of the profile, until a threshold flow D, for example a predetermined percentage of the peak milk flow P, is reached. The rising phase thus runs from t0 to t1. Here, the definition used is D=0.8×P, but obviously other definitions are possible as well. The falling phase, lastly, is taken as the period from when the flow falls below the threshold flow D until the moment the milking cup is removed, at least the end of the milking using that milking cup, and thus runs from t2 to t3. However, also in this case, other definitions are possible, such as the time until a predetermined reduction threshold, which may be fixed, or a percentage of the peak milk flow etc. is reached. It should be noted here that the illustrated milk flow profiles are slightly idealized in order not to detract from the aspects which are relevant for the invention.

FIG. 2a shows a milk flow profile which is clearly bimodal, in which the milk flow reaches a local maximum at 6, then falls to a minimum at 7 and only then increases up to the main milking phase. As the milk flow will never occur in a perfectly monotonously rising line and small variations may always occur, it is necessary to define thresholds to determine what is and what is not a bimodal peak/trough. Again, definitions may be chosen freely in principle. Here, for example, was used that the peak has to be at least 200 g/min, that then a decrease of at least 100 g/min takes place and that there is a time period of at least 6 seconds between this peak and a subsequent peak. Obviously, other definitions are possible.

However, FIG. 2a has another characteristic which is often observed with bimodal milk flow profiles and that is a long rising phase and a long falling phase. The long rising phase, with "long" being defined here as longer than 30 s, is logical as such, since the milk flow already starts with the cistern milk, i.e. before the alveolar milk is milked, which latter milk is responsible for reaching the main milking phase. However, it has also been found that it is exactly the end of the milking operation, the falling phase, which takes longer with a bimodal milk flow profile, the definition of "long" again being longer than 30 s. Again it should be noted that other definitions are possible, such as to some degree dependent on the wishes of the dairy farmer. In addition, the definitions may differ from breed to breed, as well as, obviously, from animal species to animal species.

The above is explained by means of FIG. 2b, which shows such a milk flow profile. No clear peak can be seen in the course of the milk flow. Nevertheless, this profile may still be considered to be bimodal, because the duration of the rising phase (t1–t0) and/or of the falling phase (t3–t2) is "long", in this case longer than 30 s.

Finally, FIG. 2c shows an idealized milk flow profile with a short rising phase, a beautifully flat main milking phase, and a short falling phase. In principle, such a profile has advantages in a high milk yield per total machine time, as well as an advantageous low teat strain for the dairy animal.

Another thing that should be remarked upon is the fact that with normal, healthy animals, the left and right teat will be approximately equal in terms of milk production and in terms of the ratio between, and absolute amount of, cistern milk and alveolar milk, and thus bimodality. However, the two front teats may differ from the two rear teats. On average, the latter produce more milk and may, partly as a result thereof, also have a different ratio and amount of cistern milk and alveolar milk. Thus, it is also possible that the bimodality between the front and rear teat is different. This is the reason that it may be important to measure and evaluate both a front teat and a rear teat. Furthermore, it may be that one single teat produces less milk, such as is the case with mastitis. Nevertheless, this teat also has to be milked. However, due to the completely different amount of milk for this teat, the bimodality may be different, even though a correct stimulation in particular for this teat which is often sensitive is very important. It may thus be advantageous to determine the milk flow profile of all teats, at least of a front teat, a rear teat and, in addition, all mastitis teats.

It is possible to determine a bimodality for each milk flow profile. In the simplest case, the only distinction that is made is between bimodal and non-bimodal. However, it is certainly possible to assign a degree of bimodality. For example, a profile with a clear local peak-and-fall in the rising phase is assigned a number which indicates how far the milk flow drops after the peak. This may be a percentage of the local peak, a percentage of the peak milk flow in the main milking phase. It is also possible to take the local minimum as a starting point, for example as an absolute value, or again as a percentage of the peak milk flow in the main milking phase. Still other calculations, such as combinations of the above, are not excluded.

In addition, it is also possible to assign a bimodality value to milk flow profiles of the type from FIG. 2b. This is then coupled, for example, to the length of the rising phase and/or of the falling phase, again as absolute duration, or for example in relation to the length of the main milking phase. Furthermore, these values may also be used in a bimodality value of profiles of the type from FIG. 2a.

The objective, in all cases, is to be able to assign a bimodality value to each milk flow profile. In this case, the exact value is not even the most important thing, since the aim is, in principle, to reduce it. That is the reason why an arbitrary calculation has been used below, but could be taken as an exemplary function "bimodality value=[1−(milk flow @local minimum)/(milk flow @local peak)] (if present)+ [rise time/30 s−1]+[fall time/30 s−1]. It is clearly emphasized that other functions are possible.

FIG. 3 shows a diagrammatic diagram for a dairy animal with the bimodality as a function of the stimulus time. In this case, the dairy animal is milked at a fixed rhythm, in the morning and in the evening, here at 7 a.m. and at 6 p.m, respectively. Even though, in practice, there will not be many cases where a fixed 12-hour rhythm is maintained, it has been chosen here in order to explain the differences at different intervals. For the diagram of FIG. 3, it has been assumed that the waiting time, i.e. the time between the end of the stimulation and the start of the real milking, is constant. However, it is also possible to vary the waiting time or the combination of stimulus time and waiting time instead of the stimulus time. The results may be determined in the same way and processed when optimizing the stimulation.

The bimodality during the morning milking operation, with the longer milking interval of 13 hours, is indicated by a cross, and that of the evening milking operation with the 11-hour interval with a circle. It can be seen that the bimodality during the longer interval is smaller, which may be explained, for example, by a larger amount of cistern milk as well as a quicker excitability by reason of a likewise larger amount of alveolar milk. It can furthermore be seen that the bimodality clearly decreases with relatively long stimulation, again because of the larger amounts of cistern and alveolar milk. It appears that the bimodality for this dairy animal becomes (virtually) zero if stimulation is continued for a sufficiently long time. However, there are cases where a dairy animal always exhibits some bimodality, even with a very long stimulation period and/or waiting time. This may be caused by the specific combination of individual milk production and udder/teat properties. Optimizing the stimulation may then involve, for example, finding the shortest stimulation which results in said lowest bimodality or which results in any other applied criterion being fulfilled, such as optimizing the milk yield per total machine time to be achieved.

In the case of FIG. 3, optimization of the stimulation may, for example, result in the bimodality value in the diagram being at most the value "A". This value is to be chosen by the farmer, for example based on the dairy animal breed or species, the desires with regard to animal welfare and animal health, such as callous formation at the teat end, etc. It is possible to reach such an optimum using the method according to the invention as follows.

Firstly, an initial measurement is performed, for example such as in FIG. 3 without any stimulation whatsoever, although in practice a standard starting value which is different from zero will often be chosen. In any case, a milking operation is then performed using this setting for the stimulus time and in this case we take the morning milking operation, i.e. with a 13-hour interval, although in practice, it may of course also be a different interval. During the milking operation, the control unit 5 determines the milk flow profile by means of the milk flow meter 4. This first milk flow profile has a degree of bimodality, which is calculated by the control unit. Let us assume that this has a value which is equal to 3×"A", with "A" being the predetermined threshold value. The bimodality is thus clearly too high. Incidentally, it is possible, and even advisable, to perform a few similar measurements, so that an average value can be determined, but for the sake of convenience, we assume that the bimodality value is 3×"A". Subsequently, the control unit increases the stimulus time by a predetermined step, for example 5 seconds.

At the next (morning) milking operation, the milk flow profile and the respective bimodality are determined again. In order to allow the dairy animal to become habituated to this modified stimulation setting, it is also possible to perform not one, but a plurality of (morning) milking operations, and then either determine an average of all these new milking operations or of, for example, the last N new milking operations. It should be noted that in the intermediate evening milking operation an identical method may be performed for the evening milking operation, i.e. with the relatively short interval.

For these new subsequent milking operation(s), it is found that approximately 1.5×"A" is the bimodality value. This is still too high, so the control unit will extend the stimulus time again. The time may be extended by the time period of 5 seconds, which was used earlier, but may also be a relatively short time, such as 2 seconds, because the difference with the threshold value "A" has become much smaller. Then, one or more (morning) milking operations are performed using this new stimulation setting. With an extension by 2 seconds, this extension period may incidentally also be shorter, because the change is smaller. After extending the time once more by 5 seconds to 15 seconds, the control unit determines the bimodality value, which is currently 0.9× "A", by means of the or each measured milk flow profile. This value is below the threshold and is thus acceptable. The control unit can now opt to keep this stimulation setting until a new milk flow profile shows an excessively high bimodality value. Alternatively or additionally, the control unit may optimize further by reducing the stimulus time, as long as the bimodality does not exceed the threshold. With the (approximately exponential) dependence illustrated here, the optimum stimulus time t2 would be approximately 13 seconds.

As has already been said, it is possible to determine and set the stimulation for the evening milking operations in the interim or, if desired, completely independently from the morning milking operations in the same way. According to the diagram illustrated here, this would result in a stimulus time of t1 of approximately 20 seconds. Obviously, both times t1 and t2 have only been found diagrammatically and they are furthermore dependent on the lactation stage, etc.

FIG. 4 diagrammatically shows a diagram with the bimodality as a function of the milking interval for a dairy animal and for two fixed stimulus times.

In this case, the respective dairy animal therefore has no fixed milking rhythm, but is able to move freely and can determine its own milking time. Since the milking interval which is consequently likewise variable has its own influence on the bimodality, the method of the control unit has now been modified slightly. Now, a fixed stimulus time is used and a number of milking operations are performed, for example six as in the Figure, but preferably a few more. As a result of the natural variation in the milking intervals, a point cloud will be created. Initially, for example, a stimulus time of 10 seconds has been selected, which resulted in six plusses. Virtually all values exceeded the threshold value "A", except those from the milking interval M1 of approximately 11 hours. This may be corroborated if the control unit also performs a regression analysis, at least a curve fit through the measured point cloud. Consequently, the control unit decides to extend the stimulus time by, for example, 10 seconds to 20 seconds, which resulted in the point cloud of triangles. In this case, intervals above the M2, well over 8 hours, have a sufficiently low bimodality. The control unit 5 may now decide to extend the stimulus time once more, now, for example, by 5 seconds. As the bimodality value is consequently reduced once more (at least that is probable), the intervals from, for example, 7 hours will have a sufficiently low bimodality. Since this may correspond to a minimum milking interval for this dairy animal, the control unit may decide to opt for this stimulus time.

A further refinement may be to subsequently set the stimulus time as a function of the milking interval. After all, it has been found that a relatively short stimulus time was already sufficient with a longer milking interval, so that it is then not necessary to stimulate the dairy animal for longer. As a result thereof, the teat is subjected to less strain and, moreover, milking can be started more quickly.

Thus, the milking system comprising the control unit which uses the method according to the invention provides advantages for the dairy animal in the form of healthier teats which are less strained, and for the dairy farmer in the form of greater capacity of the milking system and less unnecessary wear of the brushes or other stimulating means.

By combining the methods described for FIGS. 3 and 4, the control unit is also able to optimize more quickly. Thus, the control unit may, for example, already take into account the influence of another milking interval on the bimodality, so that the most efficient adjustment of the stimulus time can be found sooner. In this case, the control unit may use historical data, such as from a previous lactation of the dairy animal, or also average values for the respective breed, age, days in lactation, etc.

Optimizing the stimulation may be purely aimed at optimizing animal welfare, such as reducing the teat strain. Maximizing the milk yield per machine time may also be an objective, in which case, however, a certain minimum degree of animal welfare is to be ensured by a minimum bimodality value which is to be respected. Other criteria are of course also possible. The method and the milking system according to the invention make it possible to apply this optimization and to ensure that this optimization continues to take place even while the properties of animals change during the lactation(s).

The above-described embodiments illustrated in the drawings only serve to explain the invention and are not intended to be limiting. The scope of protection is determined by the attached claims.

The invention claimed is:

1. A method for milking a dairy animal in milking operations using an automatic milking device comprising milking cups, an adjustable stimulating means, a milk flow meter and a control unit,
   wherein the milking device is configured for a stimulating operation comprising
      stimulating the dairy animal with the stimulating means for a stimulus time determined prior to the milking operation, to induce a milk let-down reflex, as well as
      a waiting time, which is determined prior to the milking operation, between an end of the stimulating operation and a start of milking a teat of the dairy animal using one of the milking cups,
   wherein the stimulus time and/or the waiting time are adjustable by the control unit, and which waiting time may be zero,
   the method comprising:
   a) milking, comprising performing one or more milking operations on the dairy animal using the milking cups and a setting of the stimulating means which is set prior to the milking step,
   b) measuring, comprising measuring a milk flow profile of at least one rear teat or a front teat during each of the one or more milking operations using the milk flow meter,
   c) evaluating, comprising determining if the milk flow profile of each of the measured milk flow profiles is bimodal using the control unit, and
   d) adjusting, comprising, if at least one of the evaluated milk flow profiles is bimodal, the control unit automatically adjusting the stimulating operation for the dairy animal by extending the stimulus time by a stimulus-extension value and/or extending the waiting time by a waiting-extension value, wherein a) to d) are repeated at least once, including an adjusted stimulating operation and using a predetermined habituation period which comprises one of a predetermined number of milking operations or a predetermined duration.

2. The method according to claim 1, wherein d) comprises that, if none of the evaluated milk flow profiles is bimodal, the control unit automatically adjusts the stimulating operation for the dairy animal by shortening the stimulus time by a stimulation-reduction value and/or by shortening the waiting time by a waiting-reduction value.

3. The method according to claim 1, wherein in c) the control unit determines a milk flow profile as bimodal if the milk flow reaches a local peak of at least a predetermined value; then falls to a local minimum, the decrease exceeding at least a predetermined threshold, and then, after at least a predetermined interim period increases again to above said local peak.

4. The method according to claim 3, wherein the control unit assigns a value for the bimodality to the milk flow profile based on the local peak and/or said decrease.

5. The method according to claim 1, wherein in c) the control unit determines that a milk flow profile is bimodal if the milk flow, from the start of the milk flow, takes longer than a predetermined rise time to reach a peak flow of a main milking phase of the milk flow, and/or if the milk flow from said peak flow of said main milking phase takes longer than a predetermined fall time before the control unit stops the milking operation.

6. The method according to claim 5, wherein the control unit assigns a value for bimodality to the milk flow profile based on the rise time and/or the fall time.

7. The method according to claim 4, wherein the control unit automatically adjusts the stimulating in d) to a degree which depends on the value which is determined for the bimodality.

8. The method according to claim 1, wherein the habituation period for milking with the adjusted setting is chosen by the control unit based on the stimulus-extension value and/or the waiting-extension value.

9. The method according to claim 6, wherein the control unit automatically adjusts the stimulation step in d) to a degree which depends on the value which is determined for the bimodality.

10. The method according to claim 1, wherein in c) the control unit determines a milk flow profile as bimodal if the milk flow reaches a local peak of at least 200 g/minute within a predetermined period from the start of the milk flow, then falls to a local minimum, the decrease exceeding at least 100 g/minute or 20%, and then, after at least 6 seconds, increases again to above said local peak.

11. The method according to claim 3, wherein the control unit assigns a value for the bimodality to the milk flow profile based on a relative decrease after the local peak.

12. The method according to claim 1, wherein in c) the control unit determines that a milk flow profile is bimodal if the milk flow, from the start of the milk flow, takes longer than 30 seconds, to reach a peak flow of a main milking phase of the milk flow, and/or if the milk flow from said peak flow of said main milking phase takes longer than 30 seconds, before the control unit stops the milking operation.

13. The method according to claim 4, wherein the control unit automatically adjusts the stimulation in d) to a degree which depends on the stimulus-extension value and/or waiting extension value which is determined for the bimodality.

14. The method according to claim 6, wherein the control unit automatically adjusts the stimulation in d) to a degree which depends on the stimulus-extension value and/or waiting extension value which is determined for the bimodality.

15. A milking system for milking a dairy animal, comprising milking cups for milking the milk, the adjustable stimulating means, the milk flow meter for measuring the flow of the milked milk, and the control unit for controlling at least the stimulating means, wherein the milking system is configured for a stimulating operation comprising stimulating the dairy animal for a stimulus time that is adjustable by the control unit and determined prior to the milking operation using the stimulating means, to induce the milk let-down reflex, as well as the waiting time, which is determined prior to the milking operation, between the end of the stimulating operation and the start of milking a teat of the dairy animal using one of the milking cups, which waiting time may be zero, wherein the milking system, and in particular the control unit, is configured to automatically, carry out the method as claimed in claim 1.

16. The milking system according to claim 15, wherein the stimulating means comprises one or more teat-cleaning brushes or a separate cleaning cup, wherein said waiting time is greater than zero.

17. The milking system according to claim 15, wherein the stimulating means is incorporated in the milking cups, and wherein the waiting time is zero.

18. The milking system according to claim 15, wherein the milking system is a part of a milking parlor for a plurality of dairy animals, which can be visited freely by the dairy animals and wherein the habituation period is at least 4 days.

19. The milking system according to claim 15, wherein the milking system is a part of a milking parlor for a plurality of dairy animals, which can be visited freely by the dairy animals and wherein the habituation period is at least a week.

20. A milking parlor for a plurality of dairy animals and provided with the milking system as claimed in claim 15, wherein the dairy animals are milked in groups in the milking system according to a fixed rhythm with fixed milking intervals, and wherein the habituation period is 1 or 2 days.

* * * * *